L. A. DREY AND J. L. HIATT.
FRUIT JAR FASTENER.
APPLICATION FILED MAY 17, 1919.
1,352,119.
Patented Sept. 7, 1920.
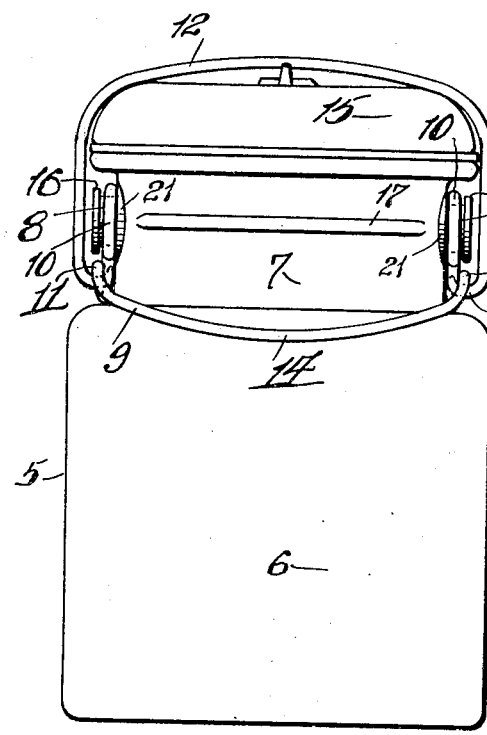
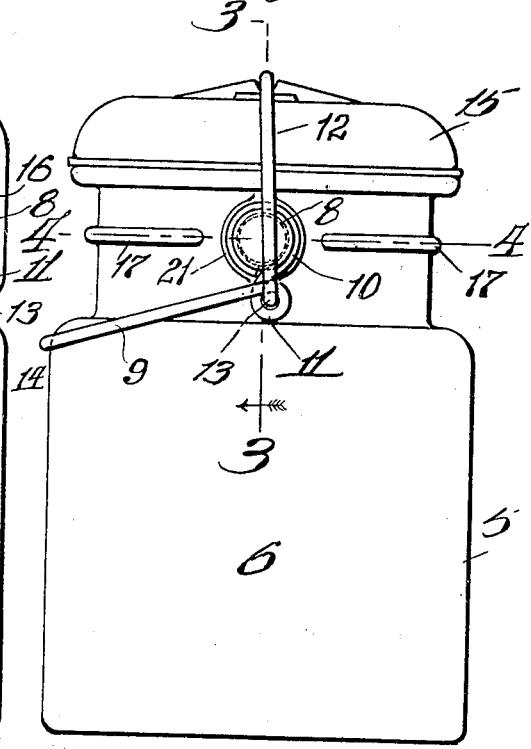
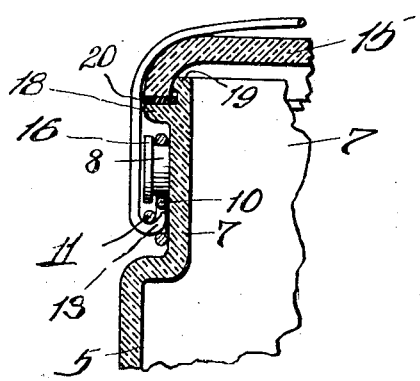
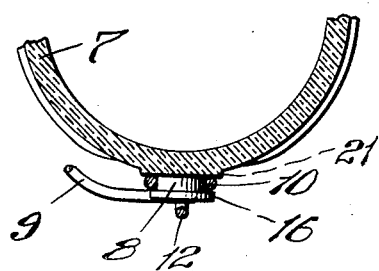
Inventor:
Leo A. Drey
James L. Hiatt
By Edward E. Longan
atty.

UNITED STATES PATENT OFFICE.

LEO A. DREY, OF ST. LOUIS, MISSOURI, AND JAMES L. HIATT, OF SAPULPA, OKLAHOMA, ASSIGNORS TO SCHRAM GLASS MANUFACTURING CO., OF ST. LOUIS, MISSOURI, A CORPORATION OF MISSOURI.

FRUIT-JAR FASTENER.

1,352,119.  Specification of Letters Patent.  Patented Sept. 7, 1920.

Application filed May 17, 1919. Serial No. 297,901.

*To all whom it may concern:*

Be it known that we, LEO A. DREY and JAMES L. HIATT, citizens of the United States, and residents of St. Louis, State of Missouri, and Sapulpa, county of Creek, State of Oklahoma, respectively, have invented certain new and useful Improvements in Fruit-Jar Fasteners, of which the following is a specification containing a full, clear, and exact description, references being had to the accompanying drawings, forming a part hereof.

This invention relates to fruit jar fasteners and has for its primary object a wire which is eccentrically secured to a glass fruit jar by means of an integral glass projection or trunnion formed thereon.

A further object is to provide a fastener for fruit jars which is composed of wire and secured to the fruit jar so that the cover may be readily removed or secured.

In the drawings:

Figure 1 is a front elevation of our device.

Fig. 2 is a side elevation of the same.

Fig. 3 is a fragmental section taken on the line 3—3 of Fig. 2 viewing the same in the direction of the arrow.

Fig. 4 is a sectional view taken on the line 4—4 of Fig. 2.

In the construction of our device, we provide a fruit jar 5 which is provided with a body portion 6 and a neck portion 7, the neck portion being provided with a trunnion or projection 8. Around this projection is secured a wire 9, this wire being provided with a loop 10 and an eye 11, the wire 9 surrounding one-half of the circumference of the neck 7.

Secured to the wire 9 is a binding wire 12 which has its ends 13 so bent as to form hooks which fit within the eyes 11, the loop 10 and the eyes 11 acting as an eccentric, so that, when the portion 14 of the wire 9 is pressed downwardly, the wire 12 will secure the lid 15 on the fruit jar.

The projection 8 is provided with a flange 16 which will prevent the loop 10 from slipping off, and the neck 7 is provided with ribs 17, these ribs extending partially around the neck, but not contacting or formed integral with the projections 8, the object of the ribs 17 being to absorb any undue stresses or strains created by forming the projection 8, and at the same time act as an ornamentation for the jar.

Near the upper edge of the neck 7, we provide a circular flange 18 which projects outwardly and a vertically projecting flange 19, these acting as a support for the lid 15. Between the lid 15 and the flange 18, we interpose a washer or gasket 20 which makes the jar leak proof and air tight.

It is to be understood, of course, that the projections or trunnions 8 are formed diametrically opposite each other on the neck 7, the wire 9 being secured to these projections and the wire or clamping member 12 being secured thereto, so that, when the portion 14 is pressed downwardly, the lid 15 will be tightly clamped on the fruit jar.

Our object in extending the ribs 17 only partially around the neck of the jar is to provide a space so that the wire 9 and its component parts may be secured over the projections 8, this wire as well as the clamping members being commercially termed "trimmings."

Formed on the bases of the trunnions or projections 8 are parallel vertical faces 21 which give a perfect circular contact for the interior surface of the loops 10. This would not be possible were these flat surfaces not present as there would be a bearing on two points only due to the cylindrical contour of the jar neck.

As previously pointed out, the clamping or securing wire 9 and the circular loops 10 and eyes 11 and the clamping bar 12 form an eccentric connection, the loops 10 completely encircling the trunnions 8 form as it were an extended bearing surface between the loops and the trunnions, thus making the operation of the portion 14 of the wire 9 smooth and even throughout its complete manipulation in securing or clamping the lid 15.

It will be further noted that the eyes 11 are slightly over center when the portion 14 of the wire is depressed to its farthest position, thus causing the same to rest against the body portion 6 of the fruit jar and any tendency of internal lifting of the lid 15 will be counteracted by the portion 14 of the wire resting against the body 6. This is also essential to prevent the external release of the lid.

The loops 10 and eyes 11 and the portion 14 are formed out of a single piece of wire, thus decreasing the cost of manufacture, and these portions all being exposed are easily kept clean and minimizing the tendency to rust, and furthermore the cost of the jar is reduced by eliminating the additional securing wires and metal ears which are commonly used at the present time, as well as saving time in securing the same to the jar, as the loop 11 need only be sprung over the trunnions 8 and the device is then ready for operation.

By making the pivotal connections of the clamp that secures the cover upon the jar as described, that is to say, of comparatively large loops 10 surrounding the opposite trunnions 8 projecting from the neck of the jar, it is possible to utilize the resiliency of the said loops in a highly advantageous manner, thus insuring a holding action of the clamp when in locked position shown in Figs. 1 and 2. Each loop 10 lies in a vertical plane that is inside the plane occupied by the eye 11, making it possible to bring the hinging and pivotal parts of the lid-holding clamp very close to the neck of the bottle, these parts in the construction being within the space bounded by the flange 18 upon which rests the gasket of the cap.

By the employment of relatively large trunnions 8 and relatively large loops 10 we obtain short lever arms between the trunnions and the pivotal connections of the lever wire 9 and the binding wire 12, thus making the clamping and unclamping action easily accomplished with but little exertion.

Having fully described our invention, what we claim is:

1. A fruit jar having a neck provided with relatively large integral and opposite trunnions, an operating member of wire formed with circular loops surrounding the said trunnions, and a clamping member adapted to hold in place the lid of the jar having pivotal connections with the said operating member below the loops therein thereby providing relatively short lever arms between the trunnions and said pivotal connections.

2. A fruit jar fastener comprising a jar having on opposite sides of its neck relatively large integral trunnions, said trunnions being provided with circular grooves, a lever wire provided on its opposite ends with circular loops seated in the grooves of said trunnions, eyes formed in said lever wire below the circular loops and a clamping wire having formed on its ends hooks seated in the eyes formed in the lever wire, the pivotal connections between the clamping wire and the lever wire being so arranged as to provide relatively short lever arms between the trunnions and said pivotal connections.

In testimony whereof, we have signed our names to this specification, in the presence of two subscribing witnesses.

LEO A. DREY.
JAMES L. HIATT.

Witnesses to the signature of Leo A. Drey:
J. HEFFERNAN,
F. BROGAN.

Witnesses to the signature of James L. Hiatt:
R. H. BARTLET,
E. BRINN.